April 15, 1930.  O. J. KUENHOLD  1,754,472

WATER HEATER

Filed March 5, 1926  4 Sheets-Sheet 2

Inventor:
Otto John Kuenhold,
By Banning & Banning
Attys.

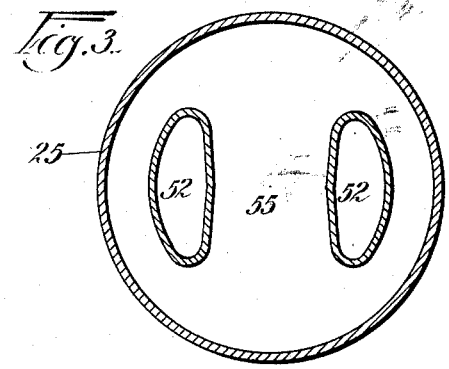
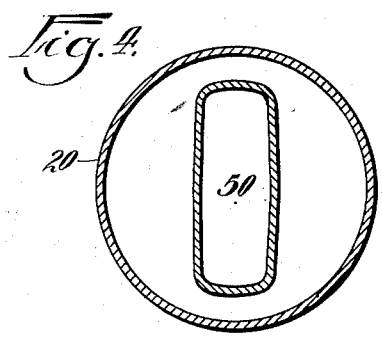
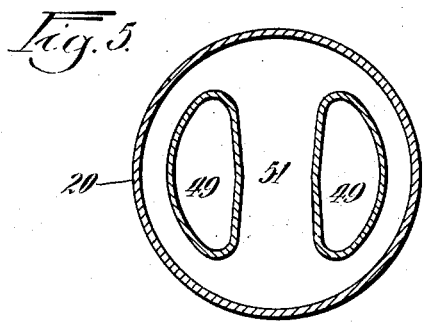
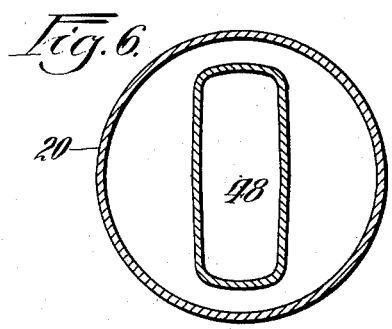
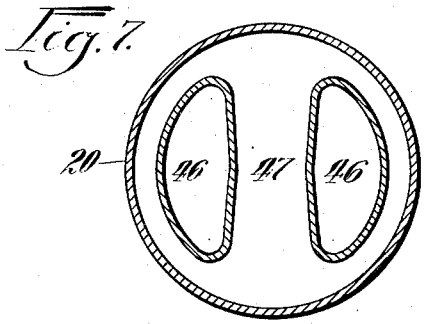
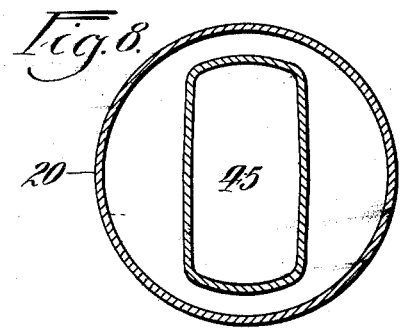
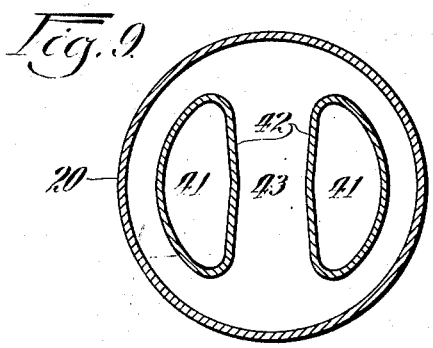
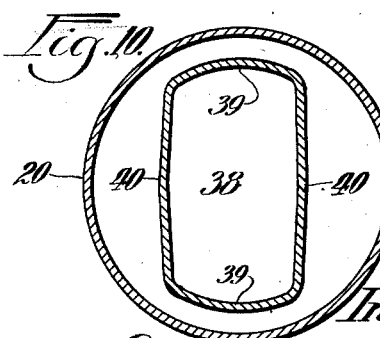

April 15, 1930.   O. J. KUENHOLD   1,754,472
WATER HEATER
Filed March 5, 1926   4 Sheets-Sheet 4
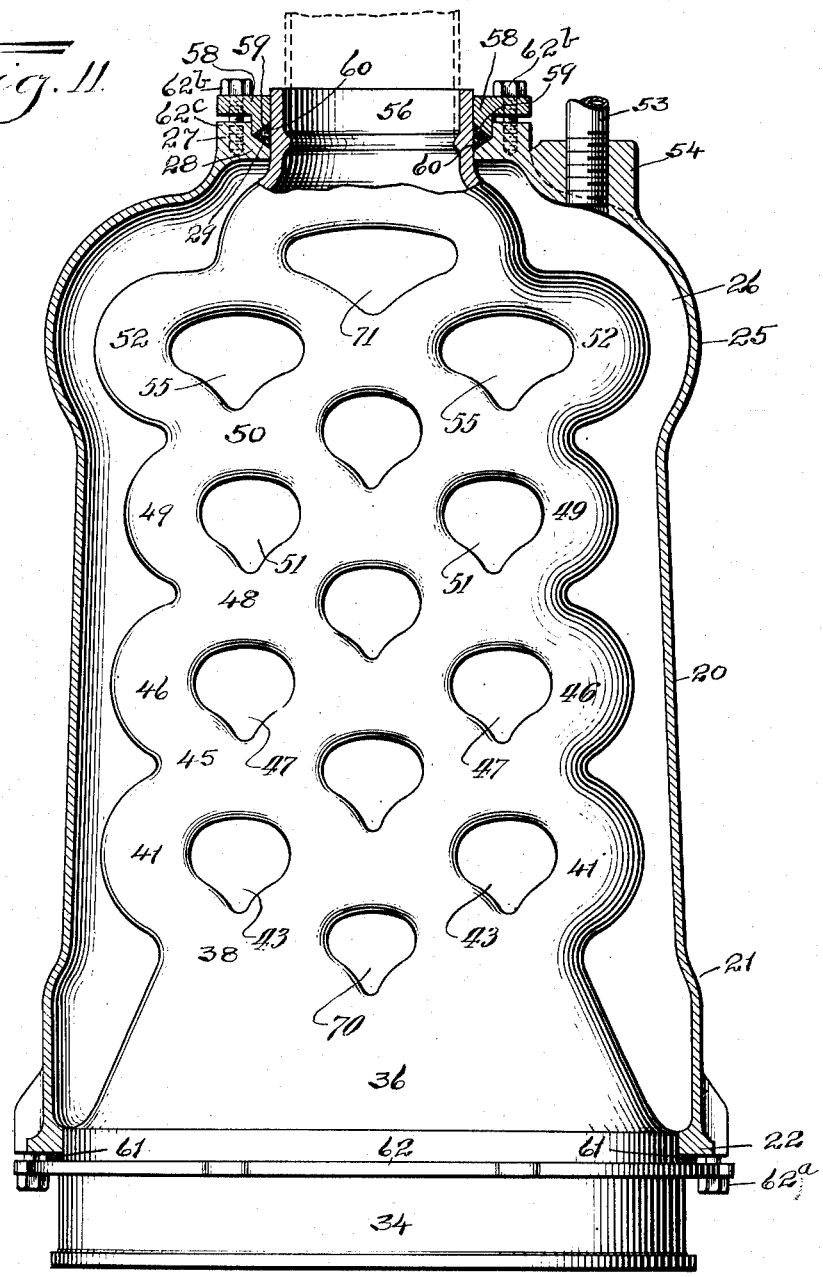

Patented Apr. 15, 1930

1,754,472

UNITED STATES PATENT OFFICE

OTTO JOHN KUENHOLD, OF CLEVELAND, OHIO, ASSIGNOR TO THE DUNHAM COMPANY, OF BEREA, OHIO, A CORPORATION OF OHIO

WATER HEATER

Application filed March 5, 1926. Serial No. 92,397.

This invention is directed to certain improvements and developments in the water heater shown and described in the patent of Charles Leroy Parker, No. 1,611,364, issued, December 21, 1926.

The present invention relates to certain modifications in the formation of the convolute flue passages therein shown for the purpose of more effectively utilizing the products of combustion in their passage from the combustion chamber through the flue passages and up to the point of discharge through the stack.

The primary object of the present invention is to constantly turn the gases over so as to repeatedly bring the hottest gases at any point into contact with the walls on the flue side and also to continually bring the coolest water at any point into contact with the same walls on the water side, the idea being to have the greatest possible temperature difference at every square inch of heat transmitting surface, so that the maximum heat transmission and a corresponding high standard of efficiency will be secured. This result is obtained by a breaking up of direct currents through the flue and water chambers by the provision of a sinuous path of travel both for the products of combustion and for the water.

The invention is also directed to certain structural details having to do with the matter of constructing and assembling the inner and outer portions of the heater structure in order to avoid complications in manufacture; to the configuration of the parts with respect to ease in assembling and disassembling the heater for the purpose of cleaning or the removal of scale; to the configuration of the convolute flue passages with a view to the avoidance of inaccessible angles or corners which would provide natural lodgment for scale or sediment; to the configuration of the flue passages with a view to high efficiency in the utilization of the products of combustion; to the configuration of the parts with reference to conditions involving expansion and contraction under heat; to the provision made for guarding against drip from the heater occasioned by condensation from the products of combustion; and to numerous other details pertaining to the efficient operation of the heater, which will more fully appear from the specification, in conjunction with the drawings, wherein,—

Fig. 3 is a cross section, taken on line 3 of Fig. 1;

Fig. 4 is a cross section, taken on line 4 of Fig. 1;

Fig. 5 is a cross section, taken on line 5 of Fig. 1;

Fig. 6 is a cross section, taken on line 6 of Fig. 1;

Fig. 7 is a cross section, taken on line 7 of Fig. 1;

Fig. 8 is a cross section, taken on line 8 of Fig. 1;

Fig. 9 is a cross section, taken on line 9 of Fig. 1;

Fig. 10 is a cross section, taken on line 10 of Fig. 1; and

Fig. 11 is a sectional view of a modified form of heater.

Figure 1:
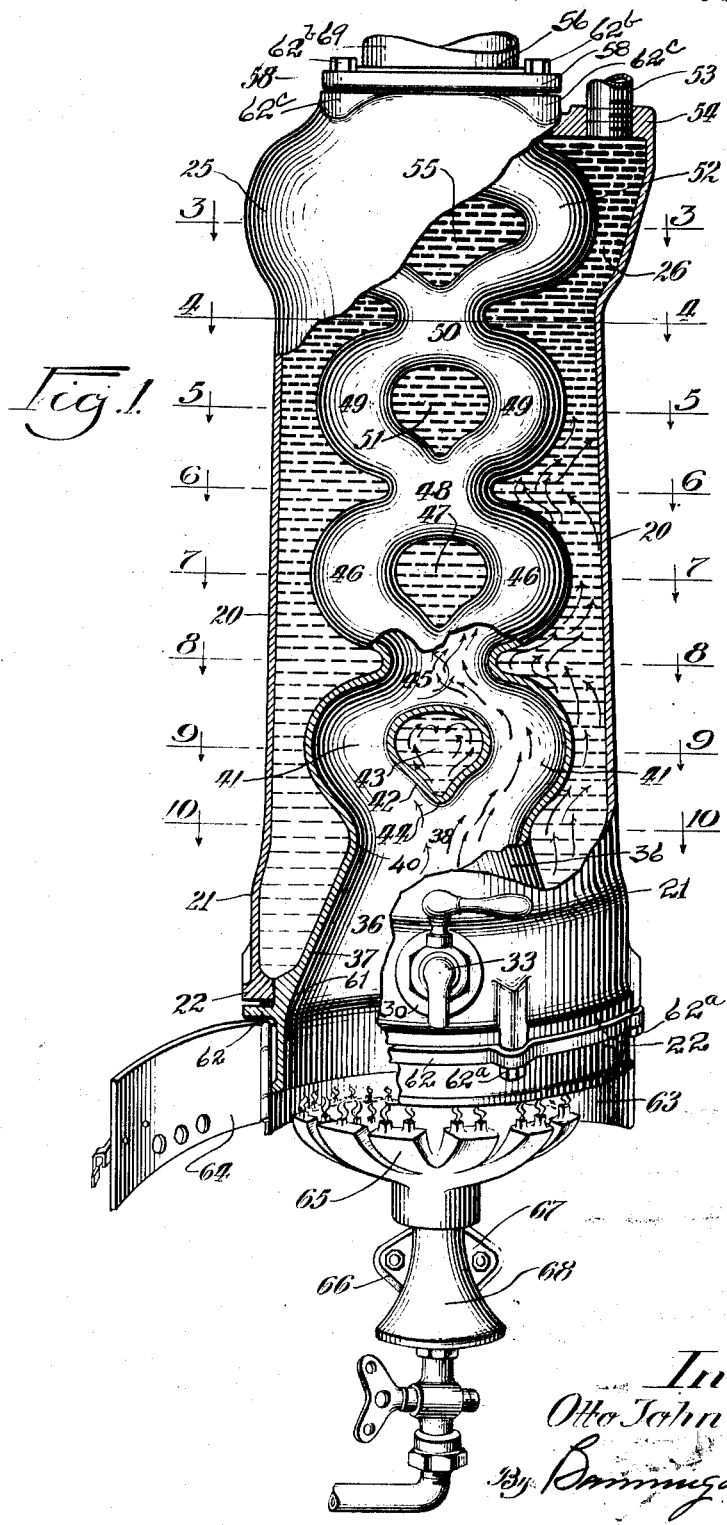
Figure 1 is an elevation, mainly in section, showing the heater of the present invention.

The heater as a whole comprises an outer shell 20 of generally cylindrical formation and slightly tapered from the bottom to the top, which shell, near its base, is shouldered at the point 21 to afford a slightly enlarged base which terminates in a base flange 22. The upper end of the shell is provided with an outward bulge 25 which affords an enlarged capacity near the upper end of the shell to afford what may be termed a water discharge chamber 26 on the interior. This gives to the upper end of the heater a substantially dome-shaped configuration, and the upper portion of the shell terminates in an upwardly extending flange or lip 27, which merges into an interior annular flange 28 provided with a beveled upper face 29.

The base of the shell is provided on its front side with a boss 30, and on its rear side with a boss 31. The rear boss receives the end of a water supply pipe 32, and the front boss receives a faucet 33 for draining the water chamber provided by the shell. The shell co-operates with an integrally formed flue casting, which more particularly constitutes the subject matter of the present invention. The flue casting comprises a base portion 34 constituting the lower portion of a combustion chamber 35, which base portion is of truly cylindrical configuration up to a point contiguous with the terminal flange 22, above which point the front and rear walls 36 of the base portion taper gradually upward. The front and rear walls are of cone-shaped configuration, and these merge into side walls 37 which are flattened and fall inwardly at a more abrupt angle than the front and rear walls, giving to the combustion chamber a laterally flattened and tapering formation up to a point considerably above the level of the bosses 30 and 31 on the outer shell.

Figure 2:
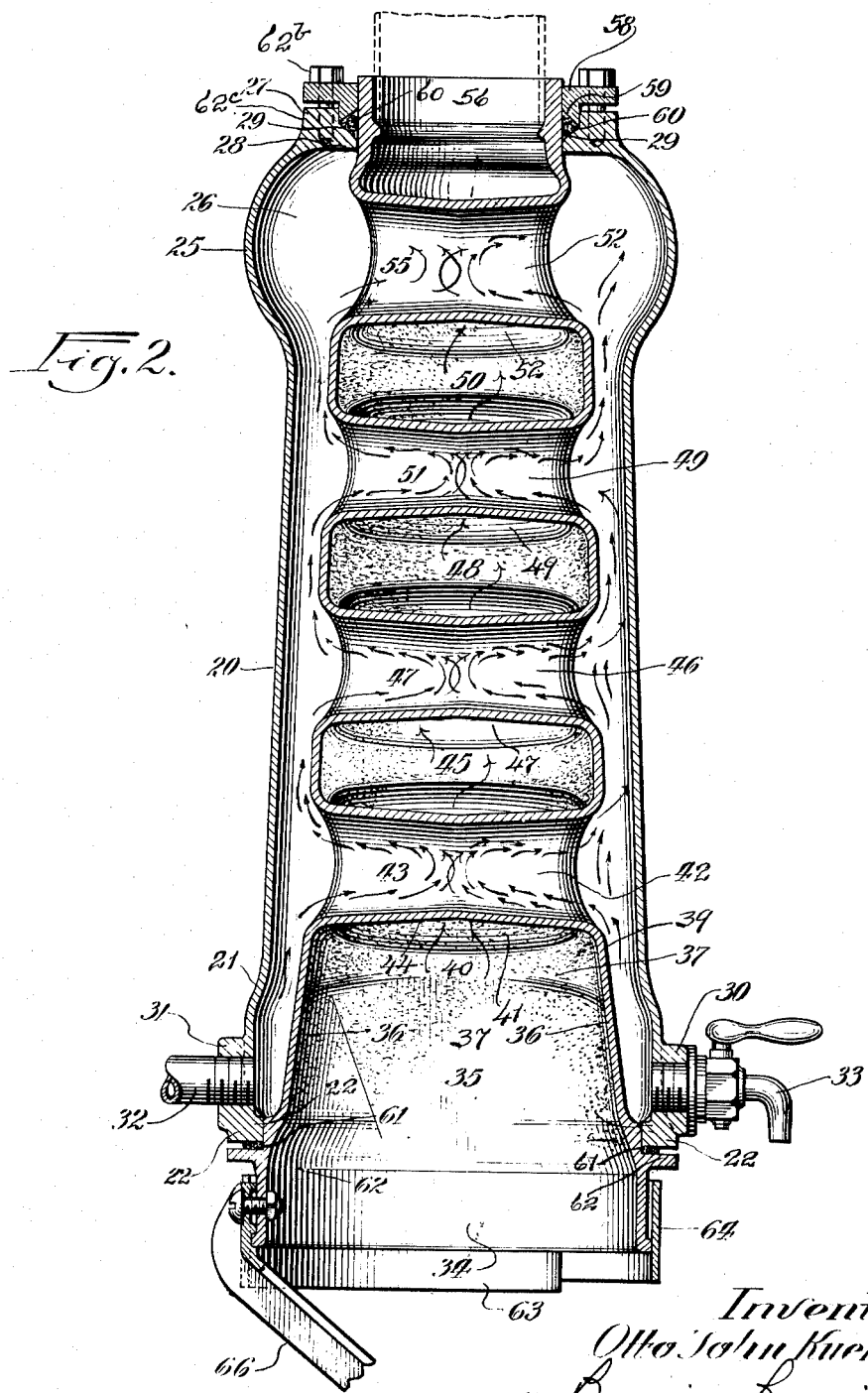
Fig. 2 is a sectional elevation, taken at right angles to the sectioned portion of Fig. 1.

In Fig. 1, the left hand side wall 36 is shown in section, and the back wall 37 in elevation, and by comparison of Figs. 1 and 2 the laterally flattened configuration of the combustion chamber will be clearly understood. The walls of the combustion chamber, at their upper ends, merge into the lowermost of a series of four convolute passages of progressively decreasing outside cross dimensions, with the exception of the upper or terminal convolute passage, which is laterally flared or distended in a manner which will be presently described in detail.

The lowermost convolute passage begins in a lower open necked throat 38, the cross configuration of which, as shown in Fig. 10, is of generally rectangular formation. The throat passage is afforded by rounding front and back walls 39—39, and flattened side walls 40—40, which are slightly bowed in the center to facilitate casting, and the throat 38 affords an enlarged conduit for the initial upflow of the heated gases from the combustion chamber below.

Above the throat 38, the flue passageway is divided into two convolute flue passages 41—41, interiorly separated from one another by the integrally formed tubular cross wall 42 of an open ended cross water passage 43, the ends of which communicate freely with the annular space between the walls of the convolute passages and the wall of the surrounding shell.

The tubular cross wall 42 is of generally cylindrical formation along its upper portion, but of tapered formation along its lower portion, terminating in an inverted centrally disposed ridge or angle 44, which, within the flue passage, presents the formation of an inverted ridge shaped baffle downwardly sloping longitudinally in each direction from the center toward the surrounding wall, as clearly shown in Fig. 2. This reverse wall of the inverted ridge forming the base of the cross water passage presents the formation of a centrally disposed base channel, as indicated in Fig. 1.

Above the rounded upper surface of the tubular cross wall, the convolute passages 41 unite in a first intermediate neck passage 45, the cross dimensions of which are shown in Fig. 8. This neck passage 45 is likewise of generally rectangular formation, but is considerably narrower and slightly shorter than the lower neck 38; and the neck passage 45 merges into and communicates with a second pair of convolute passages 46 which are separated from one another by an open ended cross water passage 47, the configuration of which is indicated in Fig. 7. In like manner, the convolute passages 46 merge into a third neck passage 48, which in turn communicates with the convolute passages 49—49, which in turn merge into a fourth neck passage 50. The convolute passages 49—49 define a third cross water channel 51, similar to those previously described.

The cross water passages thus far defined are of substantially the same cross dimensions, but become progressively shorter in length from front to rear, in general conformity to the gradually decreasing cross dimensions of the convolute passages. The arrangement is one in which the respective pairs of convolute passages afford a progressively decreasing cross area from the bottom toward the top of the heater, which areas are commensurate with the progressive decrease in the volume of heated gases due to contraction of the latter by cooling. The ratio of decrease in area between the throat 38 from the heating chamber and the next succeeding neck 45 is much greater than is the case from neck 45 to 48, and the ratio of decrease in area becomes smaller as the top of the flue is approached, since the gases will give up a greater percentage of heat units and suffer a greater ratio of contraction in the lower sections of the flue.

It will also be observed that the taper of the exterior shell is in ratio to the decrease in the exterior dimensions of the convolutes, so that the annular space between the convolutes and the shell remain substantially uniform throughout, thereby providing uniform annular passages for the water in its ascent from the bottom to the top of the water chamber.

The uppermost open neck 50 merges into an upper pair of convolute passages 52 which are more widely diverged than the immediately preceding convolute, and the upper convolutes occupy space afforded within the dome-shaped upper portion of the shell, which constitutes in effect a reservoir space from which the heated water is drawn through a vertically extending outlet pipe 53 entered through the boss 54 on the top of the heater shell.

The water outlet pipe is preferably located immediately above one of the convolute passages 52, at a medial position between the ends of the terminal cross water passage 55, to withdraw water equally from both ends of the terminal cross water passage rather than directly from one end thereof, which is desirable for the purpose of better insuring a thorough commingling of the water before its withdrawal from the heater. The invention, however, is not limited to the above relative circumferential position of the water outlet with respect to the fire door at the front, for one of the objects is that the jacket casting may be turned to a position where short and direct water pipe connections may be employed, but the inner flue casting may be turned so as to bring the fire door opening upon the most convenient side.

The terminal convolutes merge into an open throat 56 which extends upwardly through the upper end of the shell and lies in contact with the inner margin of the flange 28. The throat presents a smooth cylindrical exterior surface which is encircled by a packing gland 58 provided with an inwardly, upwardly beveled lower edge 59, which co-operates with the inwardly, downwardly tapered surface 29 in the flange 28 to receive under compression an upper packing ring 60 of triangular cross section, which ring is supplemented by a lower packing ring 61 interposed between the base flange 22 of the shell and a peripheral flange 62, which constitutes a shoulder formed around the base of the combustion chamber.

The flange 62 receives a plurality of cap nuts 62$^a$ which are inserted into the base of the shell and serve to hold the parts in tightly sealed relation at the bottom, while the gland 58 is drawn down against the upper packing ring by means of threaded bolts 62$^b$, which are entered through protruding portions of the gland and into outstanding lugs or bosses 62$^c$ formed on the upper dome-shaped portion of the shell. This arrangement seals the upper end, but permits of slippage due to expansion and contraction of the flue with respect to the casing.

The upper convolute passages 52 are configured into the throat 56, which is of about the same cross area as the cross area of the neck passages, and the water passage 55 is of substantially greater cross diameter and less length than the underlying cross water passages, the general configuration of this portion of the heater being such as to provide for a substantially greater water capacity than is afforded by corresponding lower portions of the heater.

The exterior configuration of the several neck passages is such as to afford deeply indented bays or inlets for the water, which lie in staggered relation to the cross water passages, and the entire configuration of the flue portion of the structure from bottom to top is such as to present rounded surfaces merging smoothly into other rounded surfaces at all points, so as to avoid the formation of sharp angles or corners. The walls are curved at all points so as to present the greatest strength and resistance to stresses induced by expansion and contraction, or by water pressure.

The base portion of the heater is provided with a surrounding ring shaped apron 63 provided with a hinged door 64 arranged to afford free access to a burner 65 which is supported by a bracket 66 bolted or otherwise secured to ears 67 outstanding from the base portion 68 of the burner. The heater is completed by the provision of a stack 69, which is entered within the upper end of the throat 56, as indicated in dotted lines in Fig. 2, this arrangement being desirable in order to prevent any condensation from the stack from running down on the outside of the heater wall, where it would tend to cause discoloration. The main portion of the heater as a whole thus comprises but two castings, and the proportions observed in the configuring of the flue portion of the heater, and particularly the upper or terminal convolutes thereof, are such as to permit the shell to be readily slipped to place over the flue portion, after which the gland nuts will be drawn down, tightly sealing the parts together.

The heated gases evolved in the combustion chamber pass upwardly through the lowermost neck 38, and are divided at this point and baffled outwardly by the overlying wedge shaped wall formation of the lowermost cross water passage 43, and this tends to divert a portion of the heated gases in highly expanded condition against the outer walls of the lower pair of convolutes 41, so that all portions of the flue structure at this point will be subjected equally to the heating action of the gases. After the gases have passed the middle portion of the lowermost pair of convolutes they will be diverted inwardly toward the neck 45, and this diversion, from opposite sides, occasioned by the lateral constriction of the neck at this point, will have the effect of causing the approaching currents in some measure to cross one another and intermingle at this point, so that the neck, in effect, constitutes a mixing chamber for the heated gases, which effects an interchange of heat units in the gases, after which they are again diverted through the second pair of convolutes, and twice after reunited in the neck passages 48 and 50 respectively, thereby insuring a recurrent commingling of the products of combustion in progressively decreasing volume as they pass upwardly through the convolute flue.

This breaking up of the gas currents and recurrent intermingling thereof tends to prevent the maintenance of centrally disposed currents through the flue and to maintain constant rubbing contact of the gas currents with all portions of the walls of the flue structure, even surfaces facing upwardly, so that effective heat transmission is maintained throughout all portions of the heater, the passage areas of which are plotted in ratio to the progressive contraction of the gases due to cooling, and so that there will be no tendency to choke the gases back at any point in their line of travel, which is highly important in order to guard against the formation of carbon monoxide gas, and to insure complete combustion and effective heat transmission of the heat units.

The uppermost convolute is more extended below its point of juncture with the throat, for the reason that this portion of the flue structure is subject to the direct suction from the stack, and the gases at this point are also subject to the impelling pressure of the gases from below, so that an effective current flow of the gases will be maintained through the extended terminal convolutes, despite the fact that the baffling at this point is materially enhanced.

The structure makes equal provision for the breaking up of objectional direct water currents, and provides for the thorough commingling of the water in its progress through the heater. Fig. 1, in particular, illustrates the manner in which the water currents are maintained. The water in immediate contact with the walls of the convolute flue will tend to rise directly upward, but it is important to counteract this effect by commingling all portions of the water from time to time. The water within the cross water channels will establish in and out cross currents, as indicated by the arrows, and these currents will tend, in a measure, to commingle within the interior of the cross water passages, and as they emerge therefrom will tend to break up the direct upflow of currents of heated water and divert the outlying portions of the water body inwardly toward the heated surface of the flue. In like manner, the formation of the bays contiguous to the neck passages will cause an effective breaking up of direct currents and more truly tend to maintain uniformity in the heating effect imparted to all portions of the water body.

Fig. 11 illustrates a modification which is designed particularly for use in connection with heaters of relatively large capacity, which increase in capacity is secured without materially increasing the height of the heater. In this form of construction, both the shell and the flue are increased in cross dimensions, and this increase renders it advisable to provide a larger number of cross water passages in the flue structure for the purpose of more thoroughly mixing up or commingling the products of combustion and for establishing a correspondingly greater number of cross water currents through the flue structure. In Fig. 11, therefore, the shell is given a broader or more squat configuration, but is in other respects precisely similar to the shell previously described. The flue structure, likewise, is of broader configuration, and each of the convolutes is provided with duplicate cross water passages similar to those heretofore described, which duplicate passages, however, are arranged on opposite sides of the longitudinal axis of the flue, and thus serve to subdivide each convolute into three gas channels instead of two.

In addition to the companion passages in the convolute portions of the flue structure, a plurality of centrally disposed cross water passages 70 are provided through the neck portions of the flue and in staggered relation to the convolute cross water passages, and an upper cross water passage 71 is provided immediately below the throat of the flue, which arrangement serves to afford a more involved or more sinuous passage through the flue, and to more effectually baffle the products of combustion, which is desirable in view of the greater width or spread of the flue in proportion to its height as compared with the more simplified form of construction illustrated in Figs. 1 to 10. It will be noted, however, that in Fig. 11, the cross dimensions of the flue structure are of progressively decreasing cross section from the bottom to the top, and that, aside from the increase in the number of cross water passages, the general configuration of the structure is similar to that heretofore described and its functioning is substantially the same, so that further description is deemed unnecessary.

The present heater, in either form of construction, embodies a flue in the form of an integral casting, which presents a comparatively rough surface on its interior, and this roughening, in conjunction with the sinuosity of the flue passages, develops a peculiar advantage in preventing the downflow of water of condensation, which in certain types of heaters employing smooth drawn tubing or the like requires the provision of a drip pan to catch such water of condensation. This accumulation is due to the condensation of the products of combustion upon the water cooled interior flue surfaces, when the heater is first lighted or when it is running at very small gas consumption. Such condensation occurs in the heater at points farthest removed from the burner where the heating effect is imparted to a lesser degree to the flue walls. It is important to prevent this condensation from dripping down upon and corroding the burner or clogging the gas ports and also dripping upon the floor. In the present heater, the roughness of the cast surfaces tends to spread and hold the moisture on the surface and to retard the formation of globules. This in combination with the downward and outward slope of the overhanging wall surfaces of the flue, as indicated particularly in Fig. 2, directs the flow of moisture toward the outer walls of the flue and toward the more nearly vertical surfaces from which it is not likely to drip. If moisture coalesces into globules or small rivulets, its downflow is retarded by the rough interior surfaces formed by the comparatively rough sand used in this portion of the molding, which tends to spread the moisture and prevent the formation of rivulets of appreciable size. When the moisture reaches the more highly heated surfaces in proximity to the combustion chamber, it will be re-evaporated and pass out of the stack, so that it is unnecessary in the heater of the present invention to provide a drip pan for guarding against downflow of water from the heater.

The downwardly enlarging configuration of the flue passages and their sinuous formation will interpose surfaces against the direct downflow of water from the upper portions of the heater, so that if condensation runs downwardly from the stack, or is occasioned within the flues, the dripping of such condensation from the interior will be effectively arrested or prevented.

The configuration of the convolute flues, moreover, is one which facilitates cleaning out either by flushing or by wire brushing operation, as the case may be. Where flushing is employed, the discharge from an upper convolute passage will be directed across the neck passage toward the opposite lower convolute flue passage, and vice versa, so that the flue as a whole can be effectively flushed out by the back and forth direction of the streams of water, thereby scouring out the interior of the flue; and in the case where a flexible wire brush is employed, the sinuosity of the passages will insure an effective scouring action by bringing the wire bristles firmly in contact with the surfaces. In like manner, by locating the water inlet passage in opposition to the faucet, any accumulation of sediment in the bottom of the water chamber can be scoured out by cross flushing, and the formation of the inner and outer bottom portions of the heater structure furnishes an annular channel at this point, which affords a natural point of deposit for sediment, where it may readily be removed by opening the faucet.

While ample provision is made for the commingling of the water current, at the same time no restricted passages are present which would tend to in any way obstruct the upflow of water through the heater, so that no difficulty will be experienced in obtaining an abundant flow of water at reasonable temperature, which is highly desirable in heaters of this character in preference to a scanty flow of water at high temperature.

By constructing the heater in two main castings, the parts can be readily disassembled for the purpose of cleaning out any lime deposits or the like which may accumulate on the exterior of the flue section, or interior of the jacket section; and at the same time this method of two-part construction affords easy access to all surfaces, which may each be processed or treated in any desirable manner to best insure the absorption or transmission of heat as the need may be, and to prevent rusting or corroding. The provision of the bulge in the upper portion of the shell affords certain elements of longitudinal elasticity in addition to providing for an enlarged reservoir or mixing chamber in the upper portion of the heater.

Although the heater is intended primarily for the use of gas as a heating medium, it is obvious that the flue construction might be utilized to afford a passageway for steam or other heating medium, without departing from the principle of operation heretofore pointed out. Furthermore, the heater is of a form and style which may be readily used singly or as a unit in a battery of similar heaters, delivering water to a tank or reservoir; or, in like manner, the heater may be used singly or in battery with others for hot water house heating purposes.

It will be noted that the heater is so designed that it may not only be fabricated in two main castings, as shown on the drawings, but also in one single casting, the taper or draft of the various portions being such that sand cores can readily be made, placed in the mold, anchored and vented, and such cores have the requisite strength and other qualifications necessary for rapid, economical production. It will further be noted that due to the curved dome at the top of the jacket, and to other curved surfaces, the elasticity necessary to withstand cooling stresses of the casting operation, and of the heater when in service, is provided.

An inspection of the cross sections shown in Figs. 3 to 10 will reveal how readily the mold and cores can be parted at the horizontal center line.

I claim:

1. In a water heater, the combination of an exterior shell and an interior flue portion providing an intermediate water chamber, the flue portion being composed of pairs of laterally protruding convolute gas passages, the passages of each pair being separated from one another by a tubular cross wall furnishing an open ended cross water passage, and successive pairs of convolute passages having their exterior walls bowed inwardly to afford connecting neck passages of reduced exterior dimensions, the cross sectional area of the successive pairs of convolute gas passages decreasing from the bottom toward the top of the heater, the uppermost pair of convolute passages being laterally protruded to a greater extent than the immediately adjoining lower pair of convolute gas passages, and terminating in a throat extending upwardly through the shell of the heater, and the flue structure below the lowermost pair of convolute passages being enlarged to afford a combustion chamber having open communication with said lowermost pair of passages through a neck of greater interior cross area than any of the first mentioned neck passages, substantially as described.

2. In a water heater, the combination of an exterior shell and an interior flue portion providing an intermediate water chamber, the flue portion being composed of pairs of laterally protruding convolute gas passages, the passages of each pair being separated from one another by a tubular cross wall furnishing an open ended cross water passage, and successive pairs of convolute passages having their exterior walls bowed inwardly to afford connecting neck passages of reduced exterior dimensions, the cross sectional area of the successive pairs of convolute gas passages decreasing from the bottom toward the top of the heater, the uppermost pair of convolute passages being laterally protruded to a greater extent than the immediately adjoining lower pair of convolute gas passages, and terminating in a throat extending upward through the shell of the heater, and the flue structure below the lowermost pair of convolute passages being enlarged to afford a combustion chamber, and the base of the shell bearing against the exterior wall of said combustion chamber, substantially as described.

3. In a heater, the combination of a generally cylindrical shell and a flue structure held in sealed relation to one another to afford an intermediate water chamber, the flue structure comprising in its base a combustion chamber merging into the lowermost of a plurality of superposed pairs of laterally protruding convolute gas passages, each convolute passage having that portion of its exterior wall lying proximate to the shell curved concentrically with the adjacent shell, said curved portions of the respective walls merging curvedly into a centrally disposed substantially straight open ended cross water passage, the walls of which furnish a division between the convolute passages of a single pair, and an undivided centrally disposed neck passage uniting each pair of convolute passages, and successive pairs of convolute passages progressively decreasing in exterior dimensions from the bottom toward the top of the heater, and the uppermost pair of convolute passages being exteriorly protruded laterally in greater degree than the subjacent pair of convolute passages and terminating at its upper end in an open throat projecting through the top of the heater shell, substantially as described.

4. In a heater, the combination of a generally cylindrical shell and a flue structure held in sealed relation to one another to afford an intermediate water chamber, the flue structure comprising in its base a combustion chamber merging into the lowermost of a plurality of superposed pairs of laterally protruding convolute gas passages, each convolute passage having that portion of its exterior wall lying proximate to the shell curved concentrically with the adjacent shell, said curved portions of the respective walls merging curvedly into a centrally disposed substantially straight open ended cross water passage, the walls of which furnish a division between the convolute passages of a single pair, and an undivided centrally disposed neck passage uniting each pair of convolute passages, and each neck passage being exteriorly defined by the inwardly bowed walls between adjacent pairs of convolute passages, and successive pairs of convolute passages progressively decreasing in exterior dimensions from the bottom toward the top of the heater, and the uppermost pair of convolute passages being exteriorly protruded laterally in greater degree than the subjacent pair of convolute passages and terminating at its upper end in an open throat projecting through the top of the heater shell, substantially as described.

5. In a heater, the combination of a generally cylindrical shell and a flue structure held in sealed relation to one another to afford an intermediate water chamber, the flue structure comprising in its base a combustion chamber merging into the lowermost of a plurality of superposed pairs of laterally protruding convolute gas passages, each convolute passage having that portion of its exterior wall lying proximate to the shell curved concentrically with the adjacent shell, said curved portions of the respective walls merging curvedly into a centrally disposed substantially straight open ended cross water passage, the walls of which furnish a division between the convolute passages of a single pair, and an undivided centrally disposed neck passage uniting each pair of convolute passages, and successive pairs of convolute passages progressively decreasing in exterior dimensions from the bottom toward the top of the heater, and the uppermost pair of convolute passages being exteriorly protruded laterally in greater degree than the subjacent pair of convolute passages and terminating at its upper end in an open throat projecting through the top of the heater shell, the upper portion of said shell being outwardly protruded to give increased water volume in the upper portion of the heater, substantially as described.

6. In a heater, the combination of a generally cylindrical shell and a flue structure held in sealed relation to one another to afford an intermediate water chamber, the flue structure comprising in its base a combustion chamber merging into the lowermost of a plurality of superposed pairs of laterally protruding convolute gas passages, each convolute passage having that portion of its exterior wall lying proximate to the shell curved concentrically with the adjacent shell, said curved portions of the respetcive walls merging curvedly into a centrally disposed substantially straight open ended cross water passage, the walls of which furnish a division between the convolute passages of a single pair, and an undivided centrally disposed neck passage uniting each pair of convolute passages, and each neck passage being exteriorly defined by the inwardly bowed walls between adjacent pairs of convolute passages, and successive pairs of convolute passages progressively decreasing in exterior dimensions from the bottom toward the top of the heater, and the uppermost pair of convolute passages being exteriorly protruded laterally in greater degree than the subjacent pair of convolute passages and terminating at its upper end in an enlarged open throat projecting through the top of the heater shell, the upper portion of said shell being outwardly protruded to give increased water volume in the upper portion of the heater, substantially as described.

7. A water heater consisting of a generally cylindrical shell slightly tapering from the bottom toward the top and terminating at its upper end in a protruded portion affording a dome-like upper end, and a flue portion having a flue outlet and consisting of a cylindrical base portion in sealed relation to the base of the shell, said base portion merging into an upwardly converging combustion chamber terminating in a neck portion of generally oblong formation, the side walls of said neck portion being bowed outwardly and merging curvedly into the outer walls of a pair of convolute gas passages, and said walls at a plane of closest approximation to the surrounding shell wall being of concentric curvature therewith to afford annular water passages, said side walls of the convolute gas passages merging curvedly into the walls of a centrally disposed elongated tubular open ended cross water passage, connecting said annular water passages the walls of which cross water passage constitute the inner walls of the separated convolute gas passages, and a second pair of similarly formed gas and water passages positioned above and connected with the first pair by centrally disposed unobstructed neck of less cross area than the neck of the combustion chamber and occupying the space between the walls of the upper and lower cross water passages, the exterior dimensions of the upper pair of convolute passages being less than the exterior dimensions of the lower pair of convolute passages, and an uppermost pair of convolute gas passages connected with the last described pair of convolute gas passages and having a wider protrusion than the latter and terminating in a throat projected upwardly through the top of the shell, substantially as described.

8. A heater consisting of a generally cylindrical shell slightly tapering from the bottom toward the top and terminating at its upper end in a protruded portion affording a dome-like upper end, and a flue portion having a flue outlet and consisting of a cylindrical base portion in sealed relation to the base of the shell, said base portion merging into an upwardly converging combustion chamber terminating in a neck portion of generally oblong formation, the side walls of said neck portion being bowed outwardly and merging into the outer walls of the lowermost pair of a pair of convolute gas passages, and said walls, at a plane of closest approximation to the surrounding shell wall being of concentric curvature therewith to afford annular water passages, said side walls of the convolute gas passages merging curvedly into the walls of a centrally disposed elongated tubular open ended cross water passage connecting said annular water passages, the walls of which cross water passage constitute the inner walls of the separated convolute gas passages, and a second pair of similarly formed gas and water passages connected with the first pair by a centrally disposed unobstructed neck of less cross area than the neck of the combustion chamber and occupying the space between the walls of the upper and lower cross water passages, the cross dimensions of the neck portion being approximately equal to the cross dimensions of the cross water passages, the exterior dimensions of the upper pair of convolute passages being less than the exterior dimensions of the lower pair of convolute passages, and an uppermost pair of convolute gas passages connected with the last described pair of convolute gas passages and having a wider protrusion than the latter and terminating in a throat projected upwardly through the top of the shell, substantially as described.

9. A water heater comprising, a concentric vertical shell and flue device connected adjacent their ends to provide an intermediate water chamber, said flue device having alternate enlargements and contractions throughout its length, a vertical series of transverse water passages traversing the respective enlargements of said flue and communicating at their ends with said water chamber, said alternate enlargements except the uppermost one and contractions being of successively decreasing cross-sectional area in the direction of the flow of gases and the uppermost enlargement being laterally protruded to a greater extent than the immediately adjoining lower enlargement.

10. A water heater comprising, a concentric vertical shell and flue device connected adjacent their ends to provide an intermediate water chamber, said flue device having alternate enlargements and contractions throughout its length, a vertical series of transverse water passages traversing the respective enlargements of said flue and communicating at their ends with said water chamber, said contractions being of successively decreasing cross-sectional area and said water passages of successively increasing cross-sectional area in the direction of the flow of gases, whereby to provide a flue passage of progressively decreasing cross-section from inlet to outlet.

OTTO JOHN KUENHOLD.